(12) United States Patent
Luty et al.

(10) Patent No.: US 9,038,283 B2
(45) Date of Patent: May 26, 2015

(54) BORE GAGE SYSTEM FOR SETTING AND MEASURING LARGE DIAMETER BORES

(75) Inventors: Theodore Luty, Hyde Park, NY (US); Stephen Forschler, Clinton Corners, NY (US)

(73) Assignee: Dorsey Metrology International, Poughkeepsie, NY (US)

( * ) Notice: Subject to any disclaimer, the term of this patent is extended or adjusted under 35 U.S.C. 154(b) by 277 days.

(21) Appl. No.: 13/611,010

(22) Filed: Sep. 12, 2012

(65) Prior Publication Data

US 2013/0061485 A1 Mar. 14, 2013

Related U.S. Application Data

(60) Provisional application No. 61/573,907, filed on Sep. 14, 2011.

(51) Int. Cl.
*G01B 5/12* (2006.01)
*G01B 5/00* (2006.01)
*G01B 3/26* (2006.01)

(52) U.S. Cl.
CPC .. *G01B 5/12* (2013.01); *G01B 5/00* (2013.01); *G01B 3/26* (2013.01)

(58) Field of Classification Search
CPC .............. G01B 5/12; G01B 3/26; G01B 3/46; G01B 3/22; G01B 5/0004; G01B 5/08; G01B 11/245; G01B 5/00; G01B 5/30
USPC ......... 33/544.5, 544, 542, 784, 792, 793, 794
See application file for complete search history.

(56) References Cited

U.S. PATENT DOCUMENTS

| | | | |
|---|---|---|---|
| 3,496,758 A | | 2/1970 | Sunnen |
| 4,030,202 A | | 6/1977 | Fadl et al. |
| 4,062,122 A | * | 12/1977 | Rutter .............................. 33/501 |
| 4,227,310 A | | 10/1980 | Vanderwal, Jr. |
| 4,265,026 A | * | 5/1981 | Meyer .............................. 33/542 |
| 4,307,514 A | | 12/1981 | Ange et al. |
| 4,483,078 A | * | 11/1984 | Stevens ........................... 33/797 |
| D277,557 S | | 2/1985 | Lenceski |
| 4,509,267 A | | 4/1985 | Flaten |
| 4,796,363 A | | 1/1989 | Rutter et al. |
| 4,809,440 A | | 3/1989 | Rutter |
| 4,843,722 A | | 7/1989 | Sattman |
| 4,866,855 A | | 9/1989 | Rutter |
| 4,977,681 A | * | 12/1990 | Jiles ............................. 33/544.5 |
| 5,548,901 A | * | 8/1996 | Isler ............................. 33/542.1 |
| 5,848,479 A | * | 12/1998 | MacIndoe ....................... 33/542 |

(Continued)

OTHER PUBLICATIONS

"Precision Measuring and Gaging ," Subcourse OD1642, Edition 8, The Army Institute for Professional Development, Army Correspondence Course Program, 1988, pp. 16-17.

*Primary Examiner* — Yaritza Guadalupe-McCall
(74) *Attorney, Agent, or Firm* — Saile Ackerman LLC; Stephen B. Ackerman

(57) ABSTRACT

A large bore measuring system includes a modular and extendable bore gage with analog and digital readouts, also includes a settable set-master. The modular bore gage is designed to measure two sets of large bore diameters. A first set of large bores is accomplished by using a modular bore gage design described in this disclosure. The second set of larger bores is accomplished by adding attachments therein extending the gage for the larger range of bore diameters. A set-master is used for both sets of large bores.

16 Claims, 3 Drawing Sheets

(56) References Cited

U.S. PATENT DOCUMENTS

| | | |
|---|---|---|
| 6,490,805 B1 | 12/2002 | Forschler et al. |
| 7,043,835 B2 | 5/2006 | Wiseman et al. |
| 7,913,411 B2 * | 3/2011 | Klepp .......................... 33/544.5 |
| 2009/0235546 A1 * | 9/2009 | Klepp ............................ 33/502 |
| 2013/0061485 A1 * | 3/2013 | Luty et al. ...................... 33/701 |

\* cited by examiner

9,038,283 B2

BORE GAGE SYSTEM FOR SETTING AND MEASURING LARGE DIAMETER BORES

This application claims benefit of Provisional application Ser. No. 61/573,907, filed on Sep. 14, 2011, herein incorporated by reference in its entirety, and assigned to a common assignee.

BACKGROUND OF THE INVENTION (1) Technical Field

The technical aspect of the invention relates to the precise measurement of large bore surfaces using dial indicating and digital instruments, and more particularly to the packaging of a modular system, including a set-master, that can be easily assembled and adjusted to measure a variety of large bore diameters as well as means to extend reachability to a deep bore.

(2) Description of the Prior Art

A dial bore gage is one of the most precision tools for measuring a cylindrical bore for out of roundness or taper. Bore gages are comparator type instruments used to compare an internal diameter of a cylindrical bore, which is cut in a solid material, to a known reference ring diameter. The dial bore gage does not give a direct measurement, it indicates an amount of deviation from a preset size, or the amount of deviation from one part of the bore to another. The dial bore gage is preset using either a master ring reference, an outside micrometer or a vernier caliper.

SUMMARY OF THE INVENTION

It has been a primary object of the present invention to provide a user friendly design for measuring a first wide range of large bore diameters by the packaging of a large bore gage that includes both analog and digital gages. This combination improves quality control by allowing visual checking with remote recording. The improved design includes a retractable centralizer to ease placement of the large bore gage into the bore. Furthermore, several adapters are readily assembled to the large bore gage to extend its use for measuring a second wide range of larger bore diameters. A vertical adapter is also provided to extend reachability of the large bore gage to measure deep bore diameters.

Bore gages are comparator type instruments used to compare manufactured part's inconsistencies to a known reference dimension by using a master ring facsimile made specifically for comparing a single bore diameter. Therefore, another object of the present invention is to provide a universal set-master that is designed for precisely setting and enabling a large bore gage to measure two ranges of large bore diameters.

DETAILED DESCRIPTION OF THE PREFERRED EMBODIMENT

Figure 1:
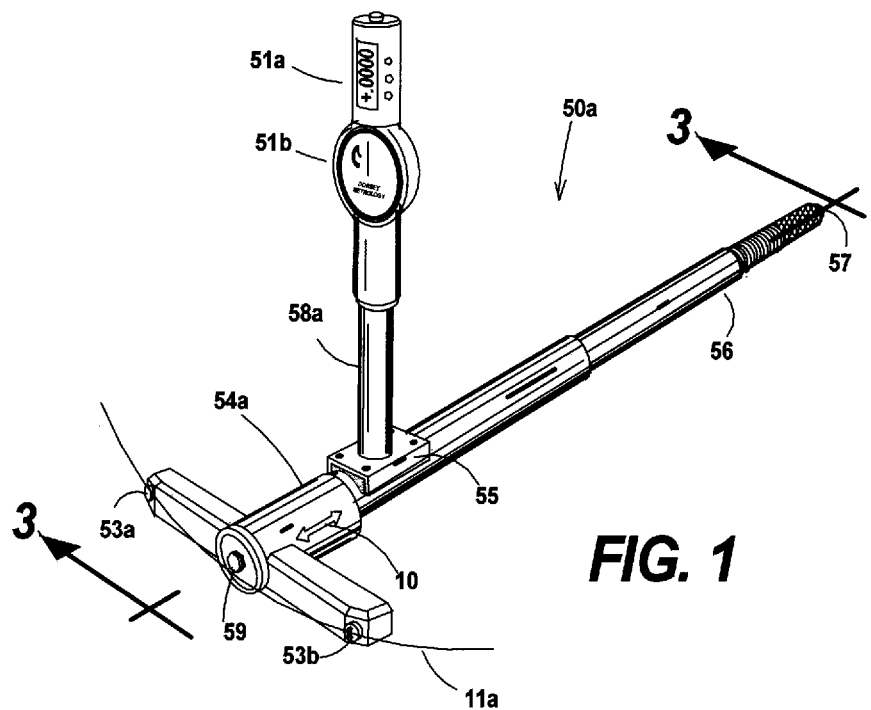
FIG. 1 is a perspective illustration of a preferred embodiment showing extendibility of the large bore gage for measuring the greater range of large bore diameters, according to the disclosure.
Figure 2:
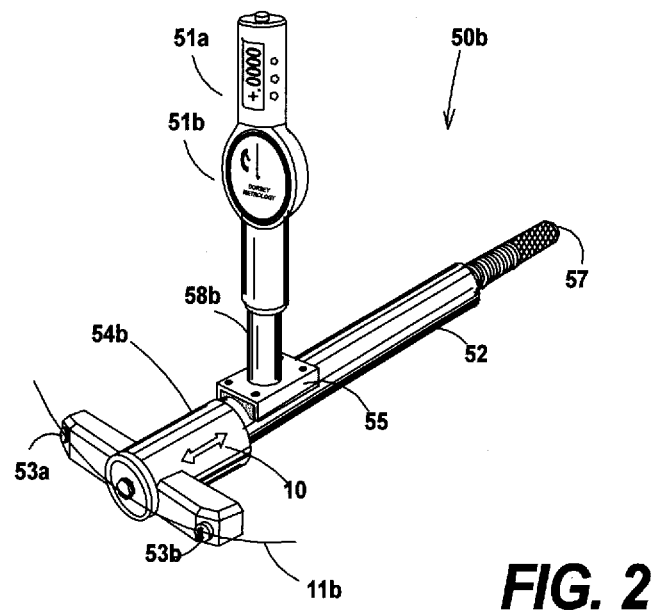
FIG. 2 is a perspective illustration showing a contraction of the large bore gage used for measuring a smaller range of large bore diameters, according to the disclosure.
Figure 3:
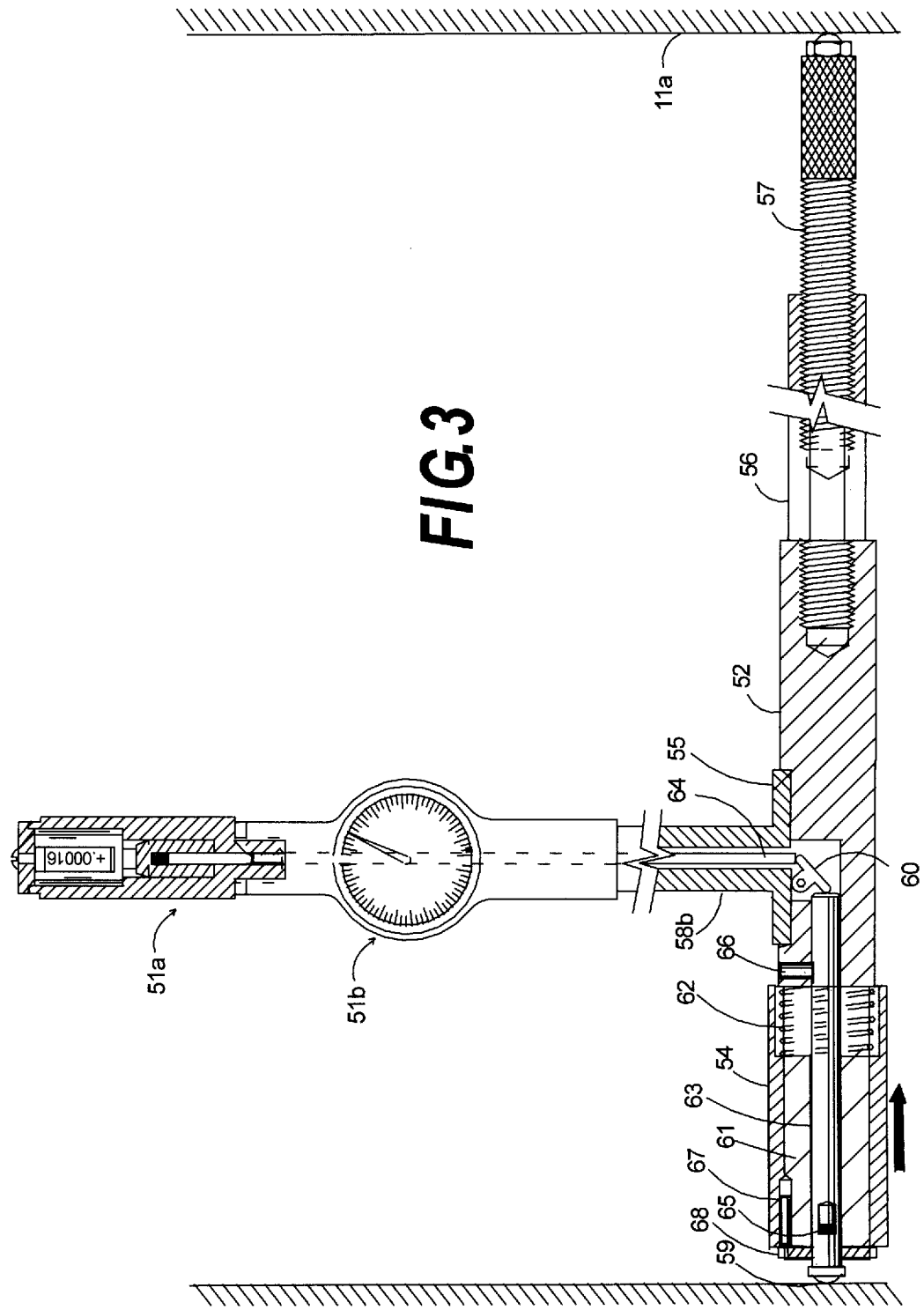
FIG. 3 is a cross-sectional side view of the large bore gage, according to the disclosure.

Refer now to FIGS. 1, 2 and 3. FIGS. 1 and 2 show perspective views of a large bore gage showing extendability and contraction of a large bore gage (large bore gage) 50 for measuring two ranges of large bore diameters. FIG. 3 is a cross-sectional side view of the large bore gage. FIG. 1, and more particularly FIG. 3 show that by adding modular extensions 54a, 56, 58a and 63 (shown in FIG. 3) increases the gauging range for the larger set of bore diameters measuring from about 21 to 36 inches in diameter.

The extended shaft member 56 has the same size thread on both ends, in which one end is a male thread connected to a horizontal gaging member 52, the other a female thread, connected to an adjustable contact shaft 57. The large bore gage, of the disclosure has a form factor making it easier to handle and to manipulate by a single user to obtain and record accurate measurements for diameters beyond 36 inches.

FIG. 1 also indicates one of several available vertical members 58a, having different lengths, for measuring deeper bores. FIG. 2 illustrates the large bore gage with a shorter vertical member 58b and without the extended member 56 therewith, achieving a quick and simple transformation for measuring the smaller range of large and shallow bore diameters ranging from about 10 to 24 inches. FIGS. 1 and 2 illustrate the modular options for measuring the two ranges of large bore diameters.

Bore gages are comparator type instruments used to compare manufactured part's inconsistencies to a known reference dimension prearranged and set within a set-master 70 illustrated in FIG. 4, to be described later. The large bore gage 50a and 50b shown in FIGS. 1 and 2 embodies a rectilinear and extendable apparatus. The large bore gage's extendibility, as shown in FIG. 1, is provided to measure a range of larger bore diameters as well as increased depths using the same instrument simply by adding an extension adapter 56 for larger bores, and an extended adapter 58a and b to reach deeper bores.

Two centralizer housings, a larger centralizer housing 54a shown in FIG. 1 and a smaller centralizer housing 54b shown in FIG. 2, are provided for two ranges of large bore diameters, as indicated by bore segments 11a and 11b respectively. Each of the centralizer housings 54a and 54b have a pair of hardened and rounded contacts 53a, 53b. The rounded contacts are geometrically spaced to accommodate the two ranges of bore diameters. The rounded contacts are assembled onto angled facets at a frontal face of each respective housing. The spacing, between the angled facets, assures contact between the pair of rounded contacts 53a and 53b, covering respective ranges of large bore diameters. A third contact 57, adjustable with a set-master, is located at the distal end of the large bore gage. The centralizer housings 54a and 54b are located at the proximal end of the large bore gage. Located between the pair of contacts, 53a and 53b, is a rounded and hardened contact end 59 urged forward by the gage pressure of readout assembly 51, shown is FIGS. 1, 2 and 3, and is forward limited by stop pin 66 engaged within a relief length in slidable gaging shaft 63. During bore measurement, centralizer housing 54a and b are slidably retractable about large bore gage member 61, and relative to the intermediate gaging shaft 63. The centralizer is rotationally constrained by key placement 67. Contacts 53a and 53b are geometrically spaced and positioned to centralize the large bore gage. After releasing the retracted centralizer, spring 62 restores the centralizer against collar stop 68, there-upon, making three point contact between contacts 53a, 53b, and, diametrically opposite contact 57. The first end of gaging shaft 63 moves inward transferring horizontal movement to a vertical shaft 64 contained within adapter 58a and b and lever support housing 55 via a motion transfer mechanism 60 displaying a plus or minus tolerance reading on the face of dial indicator 51b and digital gage 51a.

Figure 4:
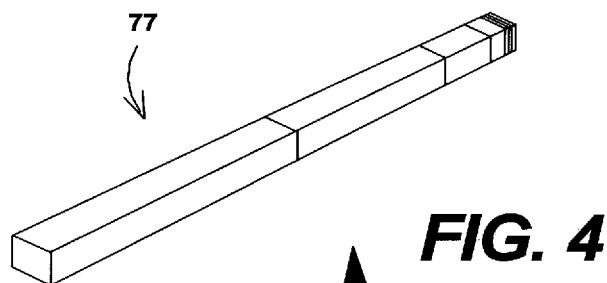
FIG. 4 is a perspective view of the linear array of wrung gage blocks to be positioned and adjusted in a setmaster shown in FIG. 5, according to the disclosure.
Figure 5:
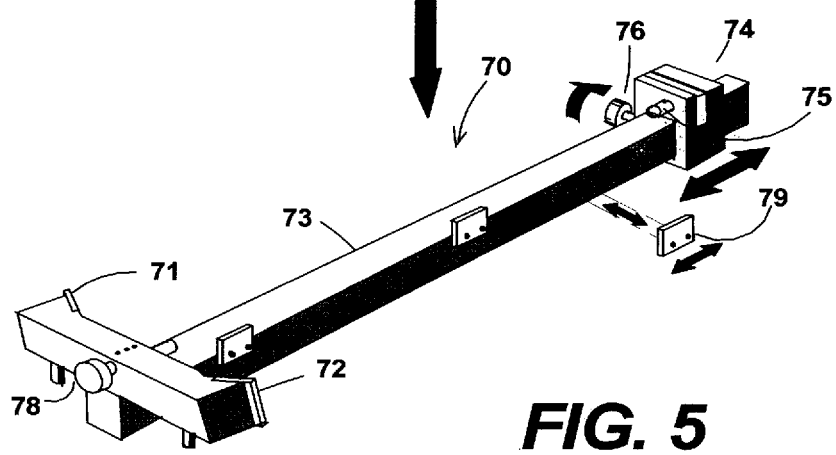
FIG. 5 is a perspective view of the set-master, according to the disclosure.
Figure 6:
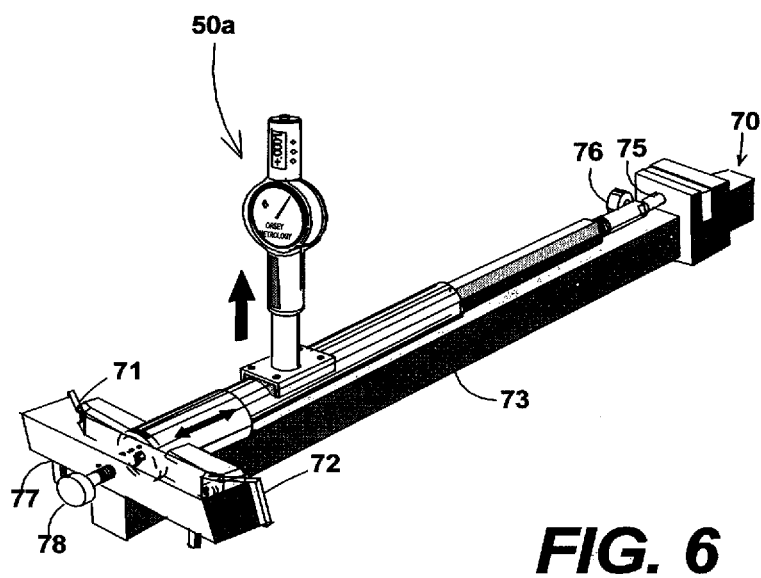
FIG. 6 is a perspective illustration of the set-master showing the large bore gage with a large bore gage in place, according to the disclosure.

Referring now to perspective views shown in FIGS. 4, 5 and 6 illustrating a method for setting a large bore gage to a given nominal diameter. FIG. 4 shows a linear array of gage blocks 77 representing the nominal diameter of the bore to be measured. The gage blocks are selected so that the total equals the nominal diameter of the bore diameter. The gage block surfaces are highly polished such that when they are wrung together, squeezing out the air between, affecting therein, a vacuous surface condition so that atmospheric pressure pushes each gage block together making the composite gage block array equal to the nominal diameter of the bore diameter.

A modular set-master 70 illustrated in FIG. 5 is designed to accommodate each of the two ranges of large bore diameters. Presetting the set-master is accomplished by installing the linear array of gage blocks 77, a chosen combination of certified (National Bureau of Standards) square faced gage blocks 77, of various thicknesses. The selected array of gage blocks, wrung to each other, linearly equal the desired bore diameter to be measured. The gage blocks are placed, en masse, onto rail 73 against centering support members 79 and against a preset adjustable diameter anvil 78. For smaller diameter bores, slidable block 74 must be relocated and locked in place with knob 76. Repositioning of block 74 may be necessary, therefore, side support members 79 can be removed and re-fastened at one of several rail locations permitting slidable block 74 to be moved inward without interference. Tightening knob 76 keeps slidable block 74 in place against spring loaded pin 75. The large bore gage is placed within the set-master, between contacts 71, 72 and distal contact 75. Setting the large bore gage to the nominal bore diameter, the dial indicator's indicator hand is set to zero as read on its dial face. FIG. 6 illustratively implies placement of the large bore gage 50 onto the set-master 70 for zeroing.

Again, referring to FIGS. 4, 5 and 6, the large bore gage must be set to a particular large bore's diameter given its nominal diameter and its acceptable deviation. Using the series of gage blocks, wrung together to squeeze out the air, forms a linear array such that the composite array of gage blocks equals the large bore's nominal diameter. The linear array of gage blocks is then placed in the set-master. The set-master is adjusted to dimensionally conform to the linear array dimension, thereafter, the array of gage blocks is removed and the set-master is now prepared to accept the large bore gage for setting. After placing the large bore gage within the prepared set-master, the dial indicator hand is adjusted to zero, setting the large bore gage to a "zero' reference so that a plus or minus deviation of the bore diameter can be read on the face of the dial indicator and recorded on a digital receiver.

During use, the gage is inserted on an angle for easy entry into the bore. The centralizer insures locating on the true diameter while the gage is "rocked" to obtain a true diameter reading. The true diameter is discerned while watching the movement of the needle on the face of the dial indicator 60. Any discrepancies in the dial reading, i.e., high points produced by particulates causing the needle to indicate a lesser diameter at its location can be easily resolved by an experienced user observing the needle movement.

Although the invention has been described with a certain degree of particularity, it is understood that the present disclosure has been made only by way of example and that numerous changes in the construction, and the manner of combining parts may be made without departing from the spirit and the scope of the invention.

What is claimed is:

1. A large bore gaging system for measuring two ranges of large bore diameters comprising;
    a settable set-master and,
    a protracted bore gage comprising a three part assembly modifiable for each range of large bore diameters in which,
    a front part comprises a centralizer, a cylindrical housing, a first measuring rod and a motion transfer device;
    an intermediate part comprises a cylindrical housing mounted perpendicular to said first part, a slideable rod conjoined with said motion transfer device at one end and a dial indicator conjoined with a digital gage at the other end;
    and an end part axially connected to the back end of said first part comprising an extension bar with an adjustable contact.

2. The large bore gaging system of claim 1 wherein said centralizer is coaxially and slideably mounted while rotationally constrained onto said cylindrical housing and spring biased forward against a stop positioned at a front end of said cylindrical housing.

3. The large bore gaging system of claim 1 wherein said three part assembly has three contact points two of which are geometrically spaced to allow accurate centering while measuring the two ranges of large bore diameters, said two contact points are placed on angled facets at a front face of said centralizer, the third is adjustably positioned at a distal end of said end part.

4. The large bore gaging system of claim 1 wherein said centralizer is slidably retractable to ease gage insertion during measurement.

5. The large bore gaging system of claim 1 wherein a centralizer is provided for each of the two ranges of large bore diameters, the angled facets and contact points are geometrically spaced to accommodate each range of large bore diameters.

6. The large bore gaging system of claim 1 wherein said intermediate part and slideable rod are replaceable with a longer cylindrical housing and a longer slideable rod to accommodating the measurement of deeper bores.

7. The large bore gaging system of claim 1 wherein said extension bar with said adjustable contact is provided to accommodate the measurement of larger bores.

8. The large bore gaging system of claim 1 wherein at least two set-masters are provided, one for each of at least two ranges of large bore diameters.

9. The large bore gaging system of claim 1 wherein presetting said set-master for each of large bore diameters, is accomplished by using a combination of certified (National Institute of Standards and Technology) gage bocks of various thicknesses wrung to each other to total up to the desired bore diameter.

10. The large bore gaging system of claim 1 wherein said combination of gage blocks are placed, en masse, onto a rail against a centering support member and against a preset adjustable diameter anvil.

11. The large bore gaging system of claim 1 wherein said set-masters comprise a supporting rail, a plurality of certified gage blocks, a frontal preset adjustable anvil for simulating a large bore curvature for a specific range of large bore diameters, a distal slideable block to accommodate adjustment for a range of bore diameters, said slideable block includes a spring loaded pin and a knob to prevent said slideable block from sliding.

12. A method for using said large bore gage system, comprising the steps of:
- providing a set-master with three contacts for a specific range of large bore diameters;
- providing a set of certified gage blocks;
- providing an elongated bore gage with a dial indicator and conjoined digital indicator;
- providing a gage block supporting rail having a centering support member and a knob for tightening a slideable block
- providing data for said nominal diameter to be measured.

13. The method of claim 12 wherein a plurality of gage blocks are selected and wrung together forming a linear array equaling said large bore's nominal diameter.

14. The method of claim 12 wherein placing said linear array of gage blocks against a centering support member and sliding said slideable block against a distal end of said linear array.

15. The method of claim 12 wherein said knob is tightened to secure said slideable end block against a spring loaded pin urging said linear assembly against said adjustable anvil and removing said linear array from said set-master.

16. The method of claim 12 wherein placing said elongated bore gage on said set-master, between said three contacts, and setting the dial indicator to zero readies said large bore gage for checking a specific bore diameter.

* * * * *